(12) United States Patent
Thames et al.

(10) Patent No.: US 6,261,033 B1
(45) Date of Patent: Jul. 17, 2001

(54) POSITIVE FEED TOOL HAVING RECTRACTABLE MEMBERS

(75) Inventors: Bruce A. Thames, Cypress; Robert E. Fowler, Houston, both of TX (US); Sam C. Jensen, Glendora, CA (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 09/335,731

(22) Filed: Jun. 18, 1999

(51) Int. Cl.⁷ .................................................. B23B 35/00
(52) U.S. Cl. ....................... 408/1 R; 408/124; 408/137
(58) Field of Search ............................ 408/1 R, 17, 124, 408/137, 138, 141

(56) References Cited

U.S. PATENT DOCUMENTS

| | | |
|---|---|---|
| 3,487,729 | 1/1970 | Juhasz et al. . |
| 3,766,313 * | 10/1973 | Bohoroquez et al. ............... 408/137 |
| 4,538,942 * | 9/1985 | Vindez ................................. 408/137 |
| 4,591,299 * | 5/1986 | Eckman ............................... 408/137 |
| 4,592,681 * | 6/1986 | Pennison et al. .................... 408/137 |
| 4,612,998 * | 9/1986 | Vindez ................................. 408/137 |
| 4,650,377 | 3/1987 | Biek . |
| 4,681,490 * | 7/1987 | Pennison et al. .................... 408/137 |
| 4,799,833 * | 1/1989 | Pennison et al. .................... 408/137 |
| 4,822,215 * | 4/1989 | Alexander ........................... 408/138 |
| 4,850,753 | 7/1989 | Dudden . |
| 5,143,161 * | 9/1992 | Vindez ................................. 408/137 |
| 5,149,232 * | 9/1992 | Eckman ................................. 408/17 |
| 5,295,770 * | 3/1994 | Pennison et al. ...................... 408/17 |
| 5,351,797 | 10/1994 | Lawson et al. . |

* cited by examiner

Primary Examiner—A. L. Wellington
Assistant Examiner—Monica S. Carter
(74) Attorney, Agent, or Firm—Coats & Bennett, PLLC

(57) ABSTRACT

An apparatus and method in a positive feed tool for automatically causing a spindle of the tool to stop retracting. The tool includes a device that automatically moves a movable member away from a differential feed gear when the spindle is retracting, which causes the spindle to stop retracting.

27 Claims, 9 Drawing Sheets

POSITIVE FEED TOOL HAVING RECTRACTABLE MEMBERS

BACKGROUND OF THE INVENTION

1. Field of the Invention

The present invention relates to positive feed tools, such as right-angle positive feed drills, and more particularly, to a method and apparatus for automatically moving a member away from a differential feed gear of the tool to cause a spindle of the tool to stop retracting.

2. Description of the Related Art

Positive feed tools, such as positive feed drills, are conventionally known for drilling holes in workpieces formed of substances such as steel, aluminum, titanium, and composites. Positive feed drills include a drill feed mechanism that feeds a drill bit into a workpiece.

FIG. 1 illustrates an example of a conventional positive feed drill, specifically a right-angle positive feed drill 10 that is coupled to a cutter 12. The positive feed drill 10 generally includes a spindle 28 that, in addition to rotating, advances a predetermined amount per revolution toward the workpiece to be drilled. Conventional applications for positive feed drills include, among other applications, drilling holes in various parts of aircraft.

The right-angle positive feed drill 10 includes an air motor 14. The air motor 14 is powered by a pressurized air source (not illustrated). As described below, the air motor 14 causes the spindle 28 to rotate. The spindle 28 is caused to rotate and feed by rotating the spindle drive gear 18 and spindle feed gear 20 with a differential feed gear 24 and differential drive gear 26. The spindle feed gear 20 includes internal threads that are threaded on the external threads 26 extending along the length of the spindle 28. Hence, when the spindle feed gear 20 is rotated in relation to the spindle 28, the spindle 28 will feed through the spindle feed gear 20. External threads 26 of the spindle 28 illustrated in FIG. 1 are left-handed threads. The spindle 28 also includes drive grooves 30 that extend along the length of the spindle 28. The spindle drive gear 18 includes internal male splines (not illustrated in FIG. 1) that engage with the drive grooves 30 on the spindle 28. Thus, when the spindle drive gear 18 is rotated, the spindle 28 also rotates.

When the air motor 14 is actuated, the spindle drive gear 18 is caused to rotate, which will turn the spindle 28 due to the engagement of the internal male splines with the drive grooves 30. In forward operation, or the drilling mode, the air motor 14 turns in a clockwise direction (as viewed from the rear of the tool 10), which turns a motor spindle 16. The series of gears 32, 34, 38, 40, 26 connect the motor spindle 16 with the spindle 28. More specifically, rotation of the motor spindle 16 will rotate the pinion 32, which in turn drives the gear 34, which is pinned or keyed to a shaft 36. The spur pinion 38 drives the idler gear 40, which drives the differential drive gear 26. In forward drill mode, the differential drive gear 26 is coupled to the differential feed gear 24 so that they turn in unison. The differential drive gear 26 is also engaged with the spindle drive gear 18. Because the spindle drive gear 18 is engaged with the spindle 28 via the drive grooves 30, the rotation of the differential drive gear 26 is transferred to the spindle 28. However, the spindle 28 is permitted to move longitudinally through the spindle drive gear 18 because of the drive grooves 30.

The spindle feed gear 20, which is threaded on the spindle 28, is driven by the differential feed gear 24 while in the forward position, as shown in FIG. 1. The spindle feed gear 20 threads the spindle 28 through the spindle drive gear 18 and feeds it toward the workpiece. Because a differential exists between the spindle drive gear 18 and the spindle feed gear 20, the spindle 28 is rotated and will advance toward the workpiece. The desired feed rate is obtained by the differential gear ratio between the spindle drive gear 18 and the spindle feed gear 20. In sum, when the air motor 14 is actuated, the spindle drive gear 18 rotates, which turns the spindle 28. When the spindle feed gear 20 is rotated faster than the spindle 28, the spindle 28 will feed, causing downward motion of the spindle 28. Conversely, when the spindle feed gear 20 rotates slower than the spindle 28, the spindle 28 will retract upward.

The right-angle positive feed drill 10 also includes a feed stop collar 42 and a feed engagement lever 44. At the completion of the advancement of the spindle 28, or at the completion of the drilling cycle, the feed stop collar 42 contacts the feed engagement lever 44. This contact lifts the differential feed gear 24 away from the differential drive gear 26 and locks it so that it does not rotate. Because the differential feed gear 24 is locked and is engaged with the spindle feed gear 20, the spindle feed gear 20 is also locked in a stationary position such that it does not rotate. With the spindle 28 continuing to rotate in a forward direction via rotation of the spindle drive gear 18, and the spindle feed gear 20 held stationary, the spindle 28 will retract.

As illustrated in FIG. 1, the cutter 12 includes a drill bit 45 for penetrating the surface of the workpiece to be drilled. A tool nose 46 surrounds the cutter 12, which attaches the tool to a drilling fixture offset from the workpiece to be drilled. The drill bit 45 is a tool that bores cylindrical holes.

As illustrated in FIG. 1, a retract stop collar 46 is attached to the spindle 28. After the spindle 28 has gone through a drilling cycle and the cutter 45 has drilled a hole in the workpiece, the spindle 28 is retracted. If the spindle 28 is permitted to retract completely, the retract stop collar 46 will abut against either the housing of the tool 10, or against another item in the tool, such as a gear, bearing, or bushing. That is, the spindle 28 will continue to retract until the motor is stopped or the retract stop collar 46 abuts against the drill and creates a high torque situation in the drive train of the tool. This high torque situation may cause damage to the internal components of the tool. For example, the spindle, gears, shafts, bearings or other portions of the drill may be damaged if the retract stop collar 46 is permitted to bear on the drill.

One conventional right-angle positive feed drill similar to that illustrated in FIG. 1 includes a valve that is actuated before the retract stop collar torques on the tool. With this conventional tool, when the retract stop collar actuates the valve, the motor of the tool is shut off so as to prevent the high torque situation and prevent damage. However, this approach of shutting down the air motor of the tool when the retract stop collar engages the housing of the tool is complicated and bulky, which makes it difficult for an operator to easily handle the conventional tool and perform maintenance on the tool. Because this conventional approach is bulky, the right-angle head of the drill includes stronger gears, shafts, and bearings, which further increases the size of the right-angle head.

With right-angle positive feed drills, it is particularly desirable that the right-angle head be as small as possible. This is because the drills are often used to bore holes as near as possible to the 90° corner of L-shaped workpieces, which increases the strength of a subsequent connection formed through the drilled hole.

The larger the head of right-angle positive feed drills, the further the bore distance from the corner of the L-shaped workpiece. Thus, it is generally desirable in right-angle positive feed drills to increase the side-to-center distance SC (see FIG. 1), which is the distance from the side of the head to the center of the spindle. Reducing the head size of positive feed drills is also desirable because the drill may be handled easier during drilling.

Another conventional right-angle positive feed drill, similar to that illustrated in FIG. 1, approaches the problem of the retract stop collar torquing on the drill by including a clutch mechanism in the tool that will trip when the retract stop collar engages the housing of the tool during the retracting of the spindle. When the retract stop collar on the spindle engages the housing of the tool head, a torque load is placed on the spindle feed gear causing it to rotate. This, in turn, rotates the differential feed gear, which is ordinarily prevented from rotating during retraction of the spindle. Rotation of the differential feed gear causes rotation of a daisy wheel of the clutch. A pair of spring-loaded rollers are positioned in the housing of the conventional tool and are in engagement with a plurality of recesses in the daisy wheel. When the differential feed gear is caused to rotate during the retract mode of the tool because the retract stop collar abuts against the tool, the daisy wheel will also rotate, displacing the rollers against the force of the springs, similar to a racheting action. This approach is described in further detail in U.S. Pat. No. 4,592,681. With this conventional approach, the right-angle head of the positive feed tool is again complicated and bulky, which is problematic for the reasons set forth above. Additionally, rotation of the daisy wheel will repeatedly subject the spindle 28 to torque spikes when the spring-loaded rollers roll over detents of the daisy wheel, which will cause the stopped stop collar 46 to thread further on the spindle and possibly damage the drill. This conventional mechanism is also prone to wear due to the frictional engagement of the spring-loaded rollers.

Thus, it is apparent that some conventional positive feed drills are particularly vulnerable to being damaged when subjected to a high torque situation during retracting of the spindle. These positive feed drills may be permanently damaged if the operator of the drill does not immediately shut off the motor when the retract stop collar is about to abut against the housing of the tool during retracting of the spindle. Hence, an operator of conventional positive feed drills must continuously monitor the retracting of the tool to determine when the retract stop collar will engage the drill. Conventional attempts to address this problem are particularly complicated and bulky.

From the foregoing, it is apparent that the above-described constraints and problems associated with conventional positive feed tools has created a need for a new, compact, and simplified approach to preventing damage to the tool when the spindle of the tool fully retracts.

SUMMARY OF THE INVENTION

Generally speaking, the present invention provides an apparatus and method for automatically moving a member away from a differential feed gear of a positive feed tool to cause a spindle to stop retracting.

According to one aspect of the present invention, a positive feed tool includes a threaded spindle, a spindle drive coupled to the spindle such that the spindle and the spindle drive gear rotate together, and a spindle feed gear threaded on the spindle. A differential drive gear is engaged with the spindle drive gear, and a differential feed gear is engaged with the spindle feed gear. At least one of the differential feed gear and the differential drive gear is moveable from a first position to a second position. The differential feed gear is coupled to the differential drive gear when the at least one of the differential feed gear and the differential drive gear is located at the first position such that the differential feed gear and the differential drive gear rotate together. The differential feed gear is not coupled to the differential drive gear when the at least one of the differential feed gear and the differential drive gear is located at the second position. A moveable member is moveable between a first location and a second location. The moveable member prevents rotation of the differential feed gear when the moveable member is at the first location and the one of the differential feed gear and the differential drive gear is located at the second position. The moveable member does not prevent rotation of the differential feed gear when the moveable member is at the second location and the one of the differential feed gear and the differential drive gear is located at the second position.

According to another aspect of the present invention, a positive feed tool includes a threaded spindle, a spindle drive gear coupled to the spindle such that the spindle and the spindle drive gear rotate together, and a spindle feed gear threaded on the spindle. A differential feed gear is engaged with the spindle feed gear and causes the spindle to advance or retract. A differential drive gear is engaged with the spindle drive gear for causing the spindle to rotate. The tool includes a preventing device for preventing the differential feed gear from rotating to cause the spindle to retract while the spindle is rotating. The tool further includes a device for moving at least a portion of the preventing device away from the differential feed gear to cause the spindle to stop retracting while the spindle is rotating.

In accordance with another aspect of the present invention, a method in a positive feed tool includes: preventing rotation of a differential feed gear of the tool with a member to cause the spindle of the tool to retract; and moving the member away from the differential feed gear to cause the spindle to stop retracting.

A further aspect of the present invention pertains to a positive feed tool having a threaded spindle, a motor, and a drive train rotatably connecting the threaded spindle and the motor. The drive train causes the threaded spindle to advance and retract while the spindle is rotating. The tool includes a device that moves a member away from a gear of the drive train when the spindle is retracting to cause the spindle to stop retracting.

Other objects, advantages, and features associated with the present invention will become readily apparent to those skilled in the art from the following detailed description. As will be realized, the invention is capable of other and different embodiments, and its several details are capable of modification in various obvious aspects, all without departing from the invention. Accordingly, the drawings and the description are to be regarded as illustrative in nature, and not limitative.

DETAILED DESCRIPTION OF THE PREFERRED EMBODIMENT

The embodiments of the present invention relate to a method and apparatus for automatically moving a member away from a differential feed gear of a positive feed tool to cause a spindle of the positive feed tool to stop retracting.

Figure 2:
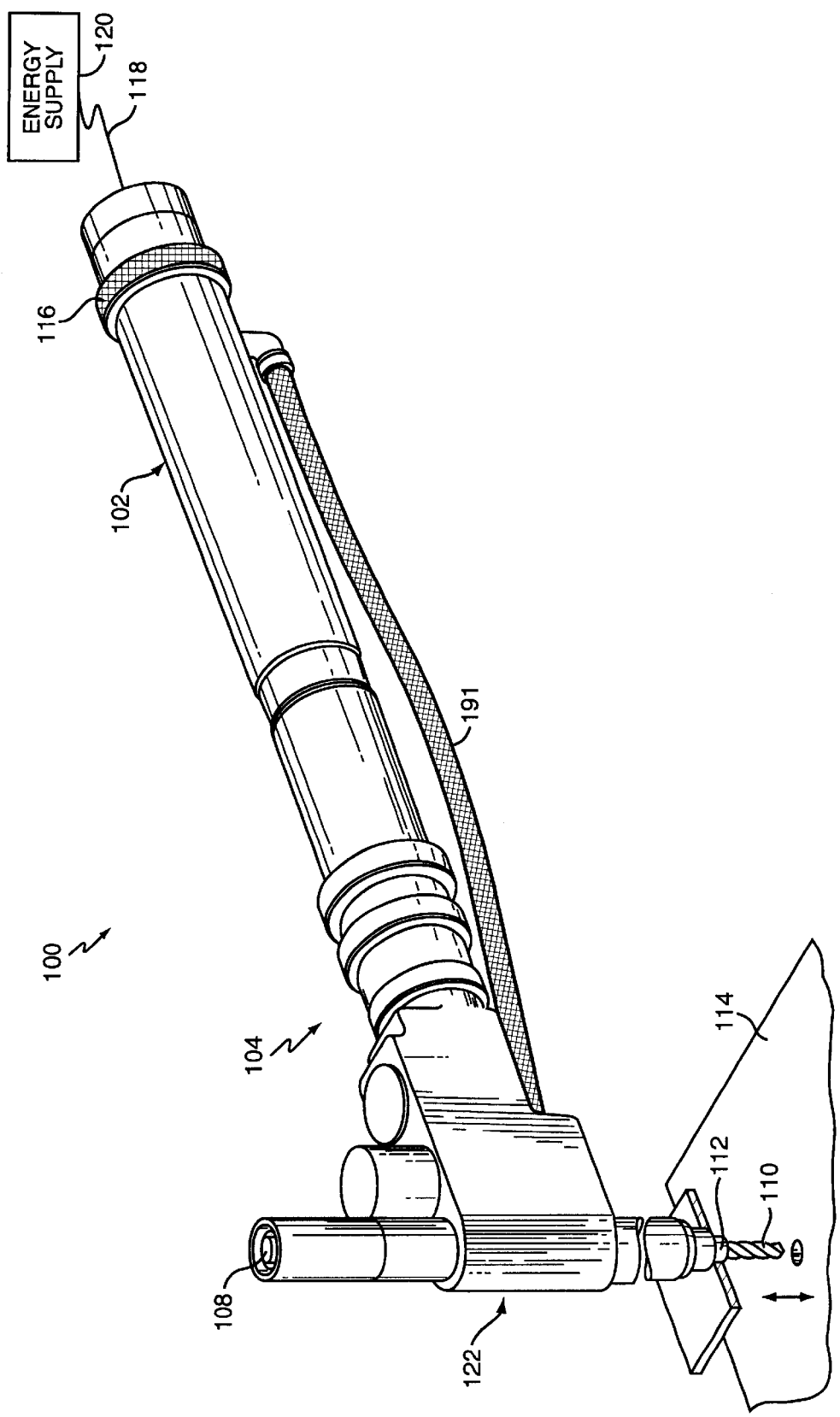
FIG. 2 is a perspective view of a positive feed tool according to one embodiment of the present invention.

According to one embodiment of the present invention, a positive feed tool, such as a right-angle positive feed drill 100, is illustrated in FIG. 2. The right-angle positive feed drill 100 includes features similar to those described in U.S. Pat. Nos. 4,799,833 and 4,591,299, the entire disclosures of which are hereby incorporated by reference. However, it will be realized that the aspects of the present invention are also applicable to other positive feed tools, such as in-line positive feed drills.

Figure 1:
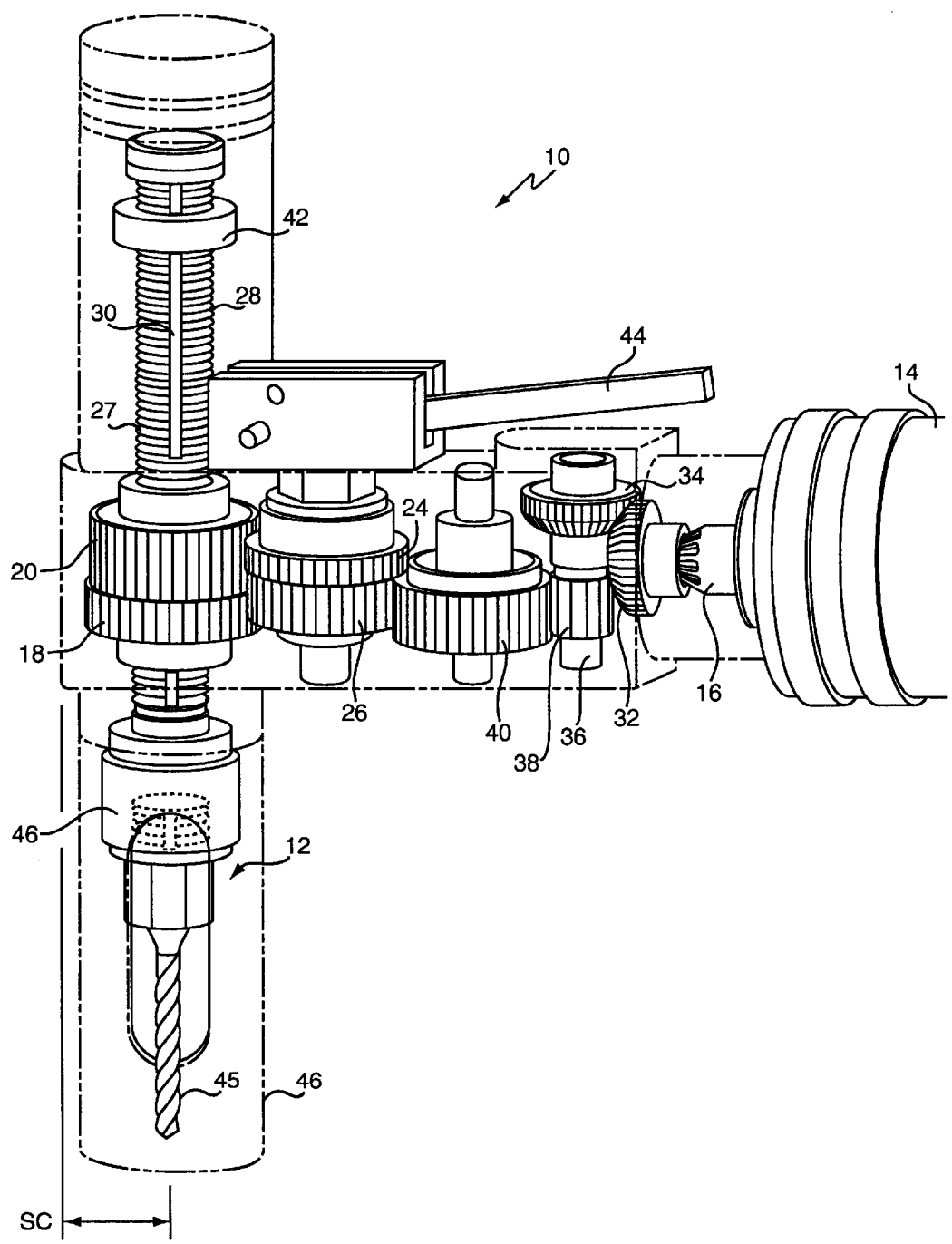
FIG. 1 is a partial operational view of a conventional right-angle positive feed drill.

The positive feed drill 100 is essentially a tool for boring holes or reaming holes in a workpiece 114. A feature of the positive feed drill 100 is that it is configured to advance a spindle 108 away from the body of the tool, i.e., toward the workpiece 114, while the spindle 108 is rotating. This is achieved in a manner similar to that described above in reference to the conventional drill 10 illustrated in FIG. 1.

The positive feed drill 100 includes a motor 102, such as a liquid driven motor, an air driven motor, or an electric motor. Hence, the motor 102 is an engine or mechanism that converts a natural source of energy into mechanical power. Thus, the motor 102 is connected to an energy supply 120 such as a device having pressurized gas, pressurized fluid, or electricity. In the preferred embodiment, the motor 102 is an air driven or pneumatic motor, similar to that used in Quackenbush Positive Feed Drill Model Nos. 230QGDA-RAC-SU-MS and 15QDA-RAB-SU-RS, commercially available from Cooper Power Tools, Houston Operation, Houston, Tex., USA.

The energy supply 120 is connected to the motor 102 via a line 118. The line 118 may be a cable, a hose, or other energy transfer conduit. The motor 102 of the tool 100 may be caused to operate by an operator manually actuating a throttle 116, such as a motor actuation lever or ring.

A drive train 104 rotatably connects the motor 102 and the spindle 108. The drive train 104 is essentially a transmission system from an output shaft of the motor 102 to the spindle 108. Hence, when the output shaft of the motor 102 is caused to rotate, the spindle 108 will also rotate. Because the tool 100 is a positive feed device, it also includes a feed mechanism by which the spindle 108 may be fed to the workpiece and/or retracted from the workpiece. In this particular embodiment, the feed mechanism is part of the drive train 104.

The positive feed drill 100 further includes a cutter 110 fixed to the spindle 108. The cutter 110 can be fixed to the spindle by a fixing device 112. The fixing device 112, can be a chuck 112, such as a four-jaw independent, a four-jaw self-center ring, a three-jaw self-center, or other types of chucks that function to fix the cutter 110 to the spindle 108. Alternatively, the cutter 110 may be fixed to the spindle 108 with a collet, a threaded connection, morse tapers, set screws, or other similar fixing devices. The chuck 112 holds the cutter 110, which can be a cutting tool, drill bit, reamer, or other device for manipulating the workpiece 114. Because the cutter 110 is connected to the spindle 108 via the chuck 112, the cutter 110 will rotate when the spindle 108 rotates. Hence, the cutter 110 will move toward and away from a workpiece 114 with the spindle 108, as illustrated by the arrow in FIG. 2. If the cutter 110 is a drill bit, the right angle positive feed drill 100 can be actuated by the throttle 116 such that it enters into a drilling cycle where the spindle 108 is rotated and fed toward the workpiece 114. This will cause the drill bit 110 to drill a hole through the workpiece 114.

Figure 5:
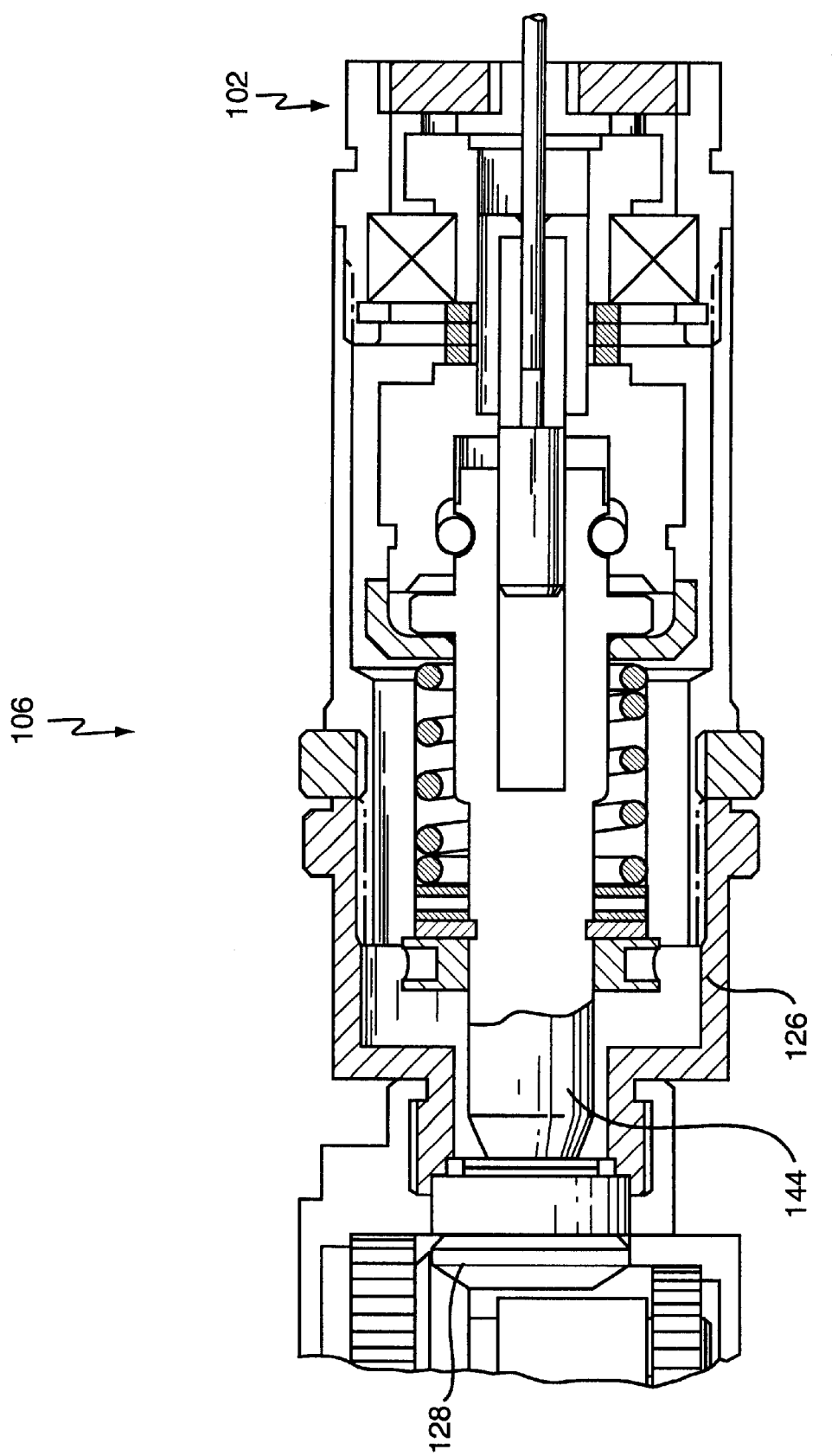
FIG. 5 is a partial sectional view of the middle portion of the positive feed tool illustrated in FIG. 1, where the clutch of the tool is located.

As illustrated in FIG. 5, the preferred embodiment of the positive feed drill 100 includes a torque-sensitive clutch 106. The torque-sensitive clutch 106 will limit transmission of power from the motor 102 along the drive train 104 when an amount of torque on the spindle 108 or in the drive train 104 exceeds a predetermined value during the feeding of the spindle toward the workpiece 114, i.e., during a drill cycle. The clutch 106 is located between the motor 102 and the right-angle head 122. The operation and structure of the clutch 106 is described in further detail in U.S. patent application entitled "Positive Feed Tool Having A Clutch," filed on Jun. 18, 1999, U.S. patent application Ser. No. 09/335,780, the entire disclosure of which is hereby incorporated by reference.

Figure 3:
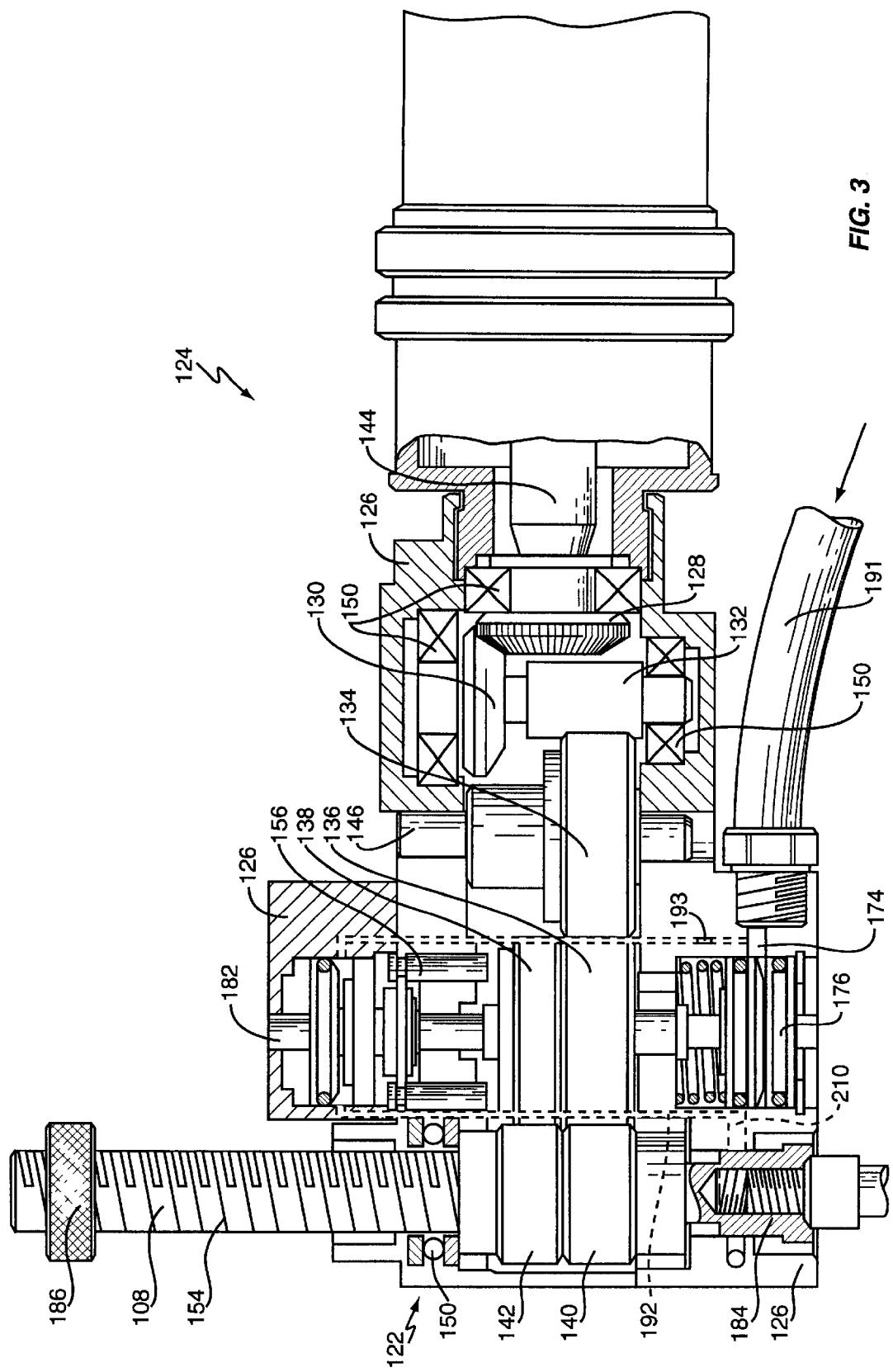
FIG. 3 is a partial sectional view of the positive feed tool illustrated in FIG. 2.
Figure 4:
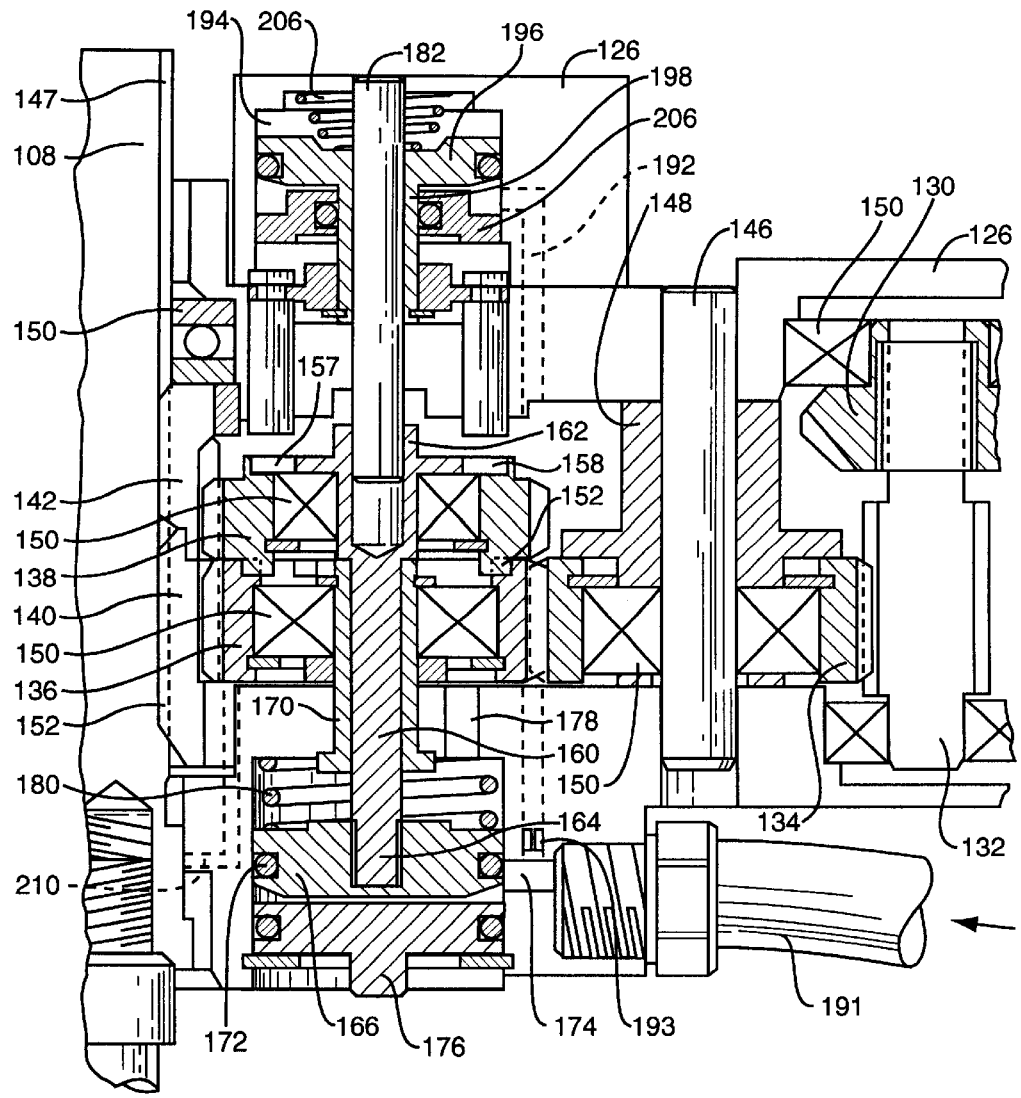
FIG. 4 is a partial sectional view of the right-angle head of the positive feed tool illustrated in FIG. 1.

As illustrated in FIGS. 3 and 4, the right-angle positive feed drill 100 preferably includes a planetary gear section 124 that is part of the drive train 104. The right-angle positive feed drill 100 further includes a housing 126 that houses the internal components of the right-angle positive feed drill 100. The housing 126 may be defined by one body. Likewise, the housing 126 may be defined by many different bodies, which is the case in the preferred embodiment of the tool 100. The positive feed drill 100 includes a plurality of gears 128, 130, 132, 134, 136, 138, 140, and 142, which operate to rotate, feed, and retract the spindle 108. In the forward operation, or in the drilling mode, the motor 102 turns in a clockwise direction (as viewed from the rear of the tool 100 illustrated in FIG. 2), and drives a shaft 144. The shaft 144 is splined at its most distal end, and drives the bevel gear 128, which in turn drives the driven bevel gear 130, which is pinned or keyed to a shaft and pinion 132. The shaft and pinion 132 drives an idler gear 134, which is mounted on a shaft 146 and held in place by a bearing spacer 148. The idler gear 134 drives the differential or main drive gear 136. A plurality of bearing assemblies 150 support or hold the rotating shafts and gears in their respective positions, as illustrated in FIGS. 3 and 4.

In forward drill mode, as illustrated in FIGS. 3 and 4, the differential drive gear 136 is coupled with the differential feed gear 138 so that they turn in unison. More specifically, the feed gear 138 includes a plurality of protrusions 152, such as lugs, pins, ears, or other similar items on a bottom surface of the differential feed gear 138 that engage with recesses or similar protrusions on the top surface of the differential drive gear 136 so that when the drive gear 136 is rotated, the differential feed gear 138 will also rotate. However, the differential feed gear 138 can also have a plurality of recesses on its bottom surface for receiving protrusions on the top surface of the drive gear 136 such that the drive gear and the differential feed gear rotate in unison.

The differential drive gear 136 is also engaged with a spindle rotation gear 140, i.e., the teeth of the respective gears 136, 140 are engaged. The spindle rotation gear 140 slips over the spindle 108, and is attached to the spindle 108 by keys 152, such as lugs, that are disposed in key ways 147. The key ways 147 preferably define four slots or grooves formed in the exterior of the spindle along the longitudinal length of the spindle 108. Thus, the spindle drive gear 140 is keyed to the spindle 108 such that relative rotation between the spindle drive gear 140 and the spindle 108 is prevented. This attachment allows transmission of rotational movement to the spindle 108, but permits the spindle 108 to move longitudinally through the spindle rotation gear 140. However, it will be realized that the spindle drive gear 140 may be coupled to the spindle 108 in other manners such that the spindle and spindle drive gear rotate together.

Also mounted on the spindle 108 is a spindle feed gear 142 that has interior threads that match with exterior threads 154 of the spindle 108. Hence, the spindle feed gear 142 is threaded on the spindle 108. The spindle feed gear 142 is driven by the differential feed gear 138 while in the forward position or spindle advance position illustrated in FIGS. 3 and 4. When the spindle feed gear 142 is rotated during a drilling cycle, the spindle feed gear 142 threads the spindle 108 through the spindle drive gear 140 in a direction away from the body of the tool, i.e., toward the workpiece 114. A rotational speed differential exists between the spindle drive gear 140 and the spindle feed gear 142 to allow the spindle 108 to be rotated and advanced toward the workpiece 114. This differential between the gears 142, 140 is created by the varying gear ratios between the gear pair 138, 142 and the gear pair 136, 140. Hence, the differential feed gear 138 and differential drive gear 136 are appropriately termed "differential" gears.

To retract the spindle 108, the motor 102 remains running forward, but the differential feed gear 138 is urged upward such that it disengages from the differential drive gear 136 and is no longer coupled to the differential drive gear 136. The differential feed gear 138 is illustrated in the disengaged position in FIG. 7A, while FIGS. 3 and 4 illustrate the differential feed gear 138 where it is engaged with the drive gear 136 such that the drive gear 136 and the differential feed gear 138 rotate together. The device for moving the differential feed gear 138 upward is described further below. When the differential feed gear 138 is moved upward, it is stopped from rotating and is locked in a stopped position by a plurality of moveable members 156, such as pins, lugs, arms, ears, or other protrusions. In the preferred embodiment, the tool 100 includes four movable members that are circumferentially and equally spaced from each other (only two of the members 156 are illustrated for purposes of clarity). However, the tool 100 will also function as contemplated with only one moveable member 156, or more or less than four movable members. When the differential feed gear 138 is disengaged from the differential drive gear 136, corresponding protrusions or recesses 158 of the differential feed gear 138 interfere with the members 156. Hence, the differential feed gear 138 is prevented from rotating by the members 156 and is thus locked in place.

Although it is preferred that the differential feed gear 138 be moved away from the differential drive gear 136, the spindle 108 may be retracted in other manners. For example, the differential drive gear 136 may be moved away from the differential feed gear 138 to decouple the two gears. Likewise, the differential feed gear 138 and the differential drive gear 136 can both move away from each other to decouple the two gears to cause the spindle 108 to retract.

Because the differential feed gear 138 is prevented from rotating when disengaged from the differential drive gear 136, the spindle feed gear 142 also stops turning, which causes the spindle 108 to rotate through the internal threads of the spindle feed gear 142 and retract away from the workpiece 114. That is, because the spindle 108, and thus the spindle drive gear 140, are rotating faster than the spindle feed gear 142, the spindle will retract away from the workpiece 114.

The device for causing the differential feed gear 138 to decouple from the differential drive gear 136 is described in detail in U.S. patent application entitled "Positive Feed Tool Having A Clutch," filed on Jun. 18, 1999. Thus, only a brief description of the decoupling device for causing the differential feed gear 138 to decouple from the differential drive gear 136 follows.

Figure 7B:
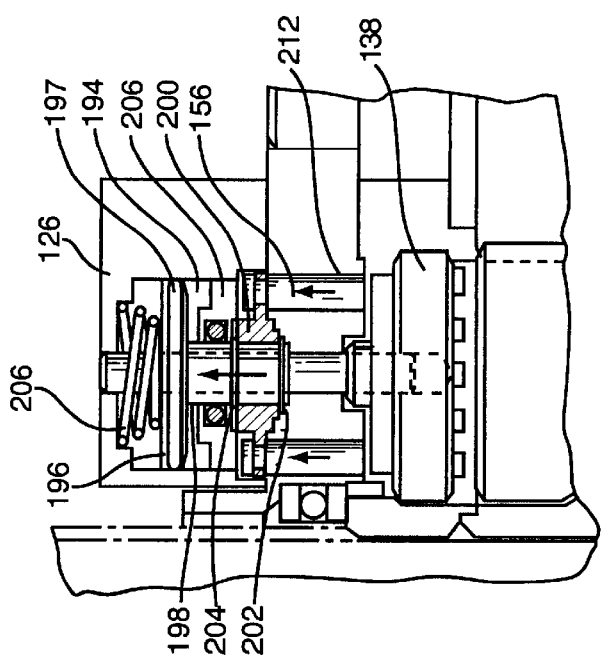
FIG. 7B is a partial sectional view of the right-angle head of the positive feed tool illustrated in FIG. 1, where the differential feed gear is disengaged from the differential drive gear and the moveable member is illustrated in the retracted position so as to not prevent the differential feed gear from rotating.
Figure 7A:
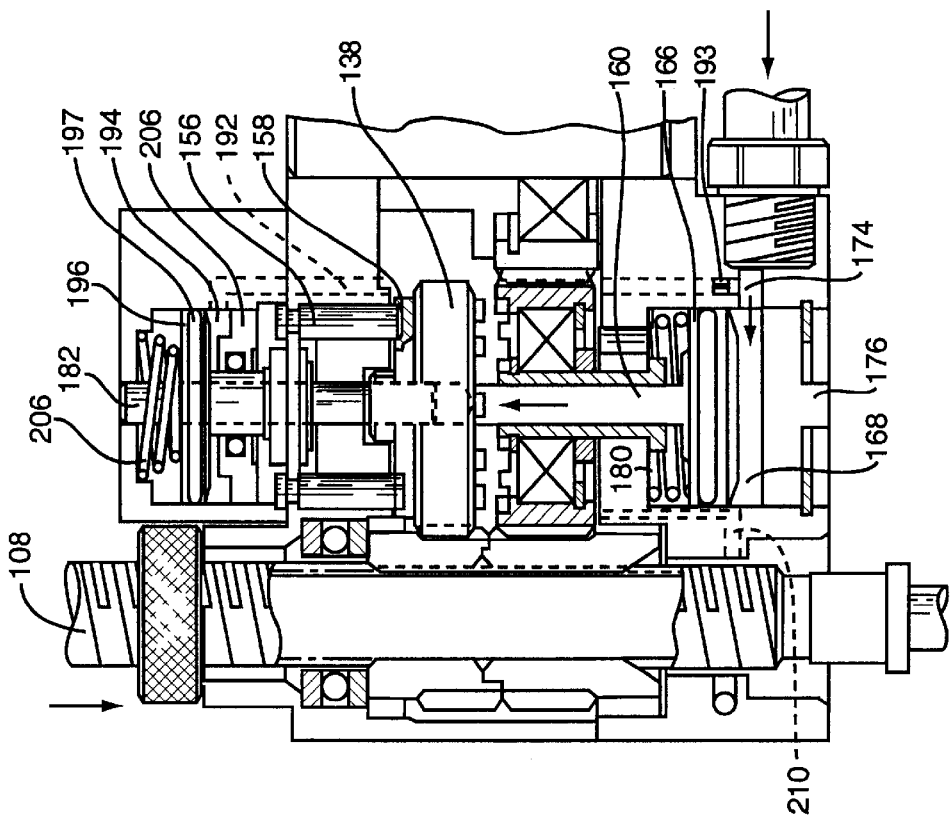
FIG. 7A is a partial sectional view of the right-angle head of the positive feed tool illustrated in FIG. 1, where the differential feed gear is disengaged from the differential drive gear and is prevented from rotating by a moveable member.

As illustrated in FIGS. 4 and 7A, the differential feed gear 138 is mounted on a retract shaft 160 by a bearing assembly 150. Hence, the differential feed gear 138 is rotatable about the retract shaft 160. However, the differential feed gear 138 is retained in place along the longitudinal axis of the shaft 160 by a retaining ring and an edge of a head 162 of the shaft 160. That is, the differential feed gear 138 is not moveable along the length of the shaft 160, even though it is rotatable about the longitudinal axis of the shaft 160. The shaft 160 extends parallel with the longitudinal axis of the spindle 108, and is moveable with respect to the housing 126. Because the differential feed gear 138 is rotatably mounted to the shaft 160 in the above-described manner, when the shaft 160 moves with respect to the housing 126 in the direction indicated by the arrow in FIG. 7A, the differential feed gear 138 correspondingly moves.

The differential feed gear 138 is located toward the distal end or head end of the shaft 160. The shaft 160 also includes a threaded portion 164 located at the proximal end of the shaft opposite from the distal end having the head 162. A piston 166 is threaded on the threaded portion 164 of the shaft 160. The piston 166 is a solid or hollow cylindrical plunger that is moveable in a cylinder 168 when subjected to a pressurized fluid. Because the piston 166 is connected to the shaft 160, when the shaft 160 moves, the piston 166 also moves.

The retract shaft 160 slides in a stationary collar 170, which is mounted to the housing 126. As shown in FIG. 4, the bearing assembly 150 for the drive gear 136 is mounted to the collar 170. Hence, when the shaft 160 moves, it will move the differential feed gear 138 relative to the drive gear 136 and the collar 170.

The piston 166 includes a recess for receiving a seal 172. The seal 172 defines a moveable seal with an interior surface of the cylinder 168 in the housing 126. For example, the piston 166 may include a recess that receives an o-ring that defines a moveable seal with the cylindrical interior surface of the cylinder 168. The housing 126 also includes a channel 174 that communicates with the interior of the cylinder 168. As described further below, and as described in the above-identified application entitled, "Positive Feed Tool Having A Clutch," pressurized fluid may be supplied to the interior of the cylinder 168 via the channel 174.

The bottom or lower portion of the cylinder 168 is sealed off by a cap 176. When pressurized fluid is supplied to the interior of the cylinder 168, the piston 166 is forcibly moved toward the members 156. The cylinder 168 includes a small vent 178 located above the piston 166 through which fluid between the piston 166 and the housing 126 may escape to atmosphere when the piston 166 is moved in the above-described manner.

The piston 166 is biased to move in a direction away from the members 156, i.e., in the feed direction, by a spring 180. The spring 180 assists in keeping the differential feed gear 138 engaged with the drive gear 136 when the piston 166 is not actuated. When the piston is actuated, the pressurized fluid in the cylinder 168 overcomes the force of the spring 180 to cause the piston 166 to move. Because the piston 166 is connected to the shaft 160, when the piston 166 moves, the shaft 160 and the differential feed gear 138 will also move.

The head 162 of the shaft 160 includes a recess that slidably receives a guide pin 182. The guide pin 182 is mounted to the housing 126 and prevents the shaft 160 from moving away from an axis parallel with the longitudinal axis of the spindle 108. Thus, the shaft 160 will slide with respect to the guide pin 182 when the piston 166 is actuated. In the above-described manner, the differential feed gear 138 may be caused to move away from the drive gear 136 such that the members 156 engage with the corresponding recesses 158 on the differential feed gear 138 and cause the differential feed gear 138 to stop rotating. The recesses 158 can be indentations, small hollows, or bores. As described earlier, when the differential feed gear 138 is prevented from rotating and is disengaged from the drive gear 136, the spindle 108 will retract through the spindle drive gear 140.

In the preferred embodiment, the differential feed gear 138 will disengage from the differential drive gear 136 when the clutch 106 illustrated in FIG. 5 actuates a valve 190 (see FIG. 6) in response to a high-torque situation on the spindle 108 or in the drive train 104. The clutch 106 illustrated in FIG. 5 will actuate the valve 190, which will supply air to the underside of the piston 166 in the cylinder 168 via the channel 174 and line 191 so as to cause the piston 166 to move toward the members 156. Hence, when a high-torque situation occurs, the differential feed gear 138 will disengage from the differential drive gear 136 and engage the members 156 such that the differential feed gear 138 is prevented from rotating relative to the differential drive gear 136. This will cause the spindle feed gear 142 to stop rotating and cause the spindle 108 to retract.

As illustrated in FIGS. 3 and 4, the spindle 108 includes a retract collar 184, which may be integral with the spindle 108 or attached to the spindle 108. For instance, the collar 184 may be a threaded nut threaded on the spindle 108, or any variety of ringlike devices. In the embodiment illustrated in FIG. 3, the collar 184 is integral with the spindle 108, but has a larger diameter than the threaded portion of the spindle 108.

When the spindle 108 is in the position illustrated in FIGS. 3 and 4, the spindle 108 is in a position where it is about to advance toward the workpiece 114 because the differential drive gear 136 is engaged with the differential feed gear 138. When the spindle 108 is advanced toward the workpiece during a normal drilling cycle, the retract collar 184 will also move toward the workpiece 114, i.e., in a direction away from the housing 126 or body of the tool 100. After the tool 100 has advanced toward the workpiece 114 and the cutter 110 has completed the desired manipulation of the workpiece 114, the feed stop collar 186 (shown in FIG. 3) will abut against the housing 126 of the tool 100 and create a high-torque situation. As described earlier, this high-torque situation will cause the clutch 106 to actuate a valve which will supply pressurized air to the underside of the piston 166. This will cause the differential feed gear 138 to disengage from the differential drive gear 136 by moving the differential feed gear 138 away from the differential drive gear 136. When the differential feed gear 138 moves away from the differential drive gear 136, it will engage the members 156 and will stop rotating, which, as described earlier, will cause the spindle 108 to retract away from the workpiece.

However, the spindle 108 is not allowed to fully retract because the collar 184 will eventually abut against the housing 126, a gear, bushing or other item of the tool 100. If this occurs, the gears, the spindle, the bearings, or the housing may be damaged. The tool 100 according to the preferred embodiment of the present invention prevents the spindle 108 from fully retracting to a location where damage to the tool may occur by automatically retracting the members 156 away from the differential feed gear 138 when the spindle retracts to a predetermined location. More specifically, the members 156 are moved away from the differential feed gear 138 when the spindle 108 has retracted to a position immediately before or when it abuts against a portion of the tool 100. As described further below, when the moveable members 156 are moved away from the differential feed gear 138 such that the differential feed gear 138 is no longer engaged with the moveable members 156 and vice versa, the differential feed gear 138 is no longer prevented from rotating. Because the differential feed gear 138 and the spindle feed gear 142 are free to rotate, rotation of the spindle 108 via the spindle drive gear 140 will cause the spindle feed gear 142 and differential feed gear 138 to rotate at essentially the same speed as the spindle 108. Thus, a differential no longer exists between the spindle feed gear 142 and the spindle drive gear 140. Hence, when the differential feed gear 138 is disengaged from the differential drive gear 136 and the members 156 are retracted away from the differential feed gear 138, the spindle 108 will drive the spindle feed gear 142 and differential drive feed gear 138 at substantially the same speed as the spindle drive gear 140 such that the spindle 108 will not advance or retract any further. This will prevent the collar 184 from torquing against the housing 126 and causing a potentially damaging high-torque situation on the spindle 108 or in the drive train 104. Depending upon the amount of friction between the threads of the spindle 108 and the threads of the spindle feed gear 142, the spindle 108 may negligibly retract for a brief period of time, which is still considered causing the spindle to stop retracting.

As illustrated in FIGS. 7A and 7B, the housing 126 includes a cylindrical bore 194 which houses a second piston 196. The second piston 196 defines a moveable seal with the cylindrical interior surface of the cylindrical bore 194, preferably with an o-ring 197, similar to the first piston 166. The piston 196 includes an elongated shaft 198 having an elongated cylindrical interior that receives a pin 182. The pin 182 is an elongated shaft which is preferably mounted to the housing 126. The piston 196 is thus mounted to the pin 182 in a moveable manner such that the piston 196 is moveable relative to the pin 182 and the housing 126 along the longitudinal axis of the pin 182. Attached to the distal end of the shaft 198 is a skirt 200, which is a disc-like member to which the moveable members 156 are mounted.

The moveable members 156 in the preferred embodiment, as illustrated in FIGS. 7A and 7B are cylindrical elongated rods or pins that are mounted to the skirt 200 such that the moveable members 156 move when the skirt 200 moves. The skirt 200 is attached to the elongated shaft 198 via a collar 202 and retaining ring 204. The moveable members 156 may be threaded, riveted, welded, bolted, glued, or attached to the skirt 200 by other measures such that the moveable members 156 move when the skirt 200 moves. Additionally, the members 156 may be integral with the skirt 200. For instance, the piston 196, shaft 198, skirt 200, and pins 156 may be one integral item, such as a machined, molded, or cast body. In the preferred embodiment, the skirt 200 has four movable members 156 attached thereto which prevent the differential feed gear 138 from rotating until the members 156 are retracted. The moveable members 156 are each located in a respective cylindrical and elongated bore 212 formed in the housing 126, which prevents the moveable members 156 from rotating about the pin 182 when engaged with the recesses 158 on the differential feed gear 138.

As illustrated in FIGS. 3, 4, and 7A, 7B, a ring 206 is also mounted to the shaft 198. The ring 206 is preferably mounted to the housing 126 such that the ring 206 is not moveable relative to the housing 126. The ring 206 maintains the shaft 198 parallel with the longitudinal axis of the shaft 182 so that the piston 196, shaft 198, skirt 200, and moveable member 156 easily move in unison along the pin 182. The ring 206 can take other configurations. For example, the ring 206 can be integral with the housing 126.

Figure 6:
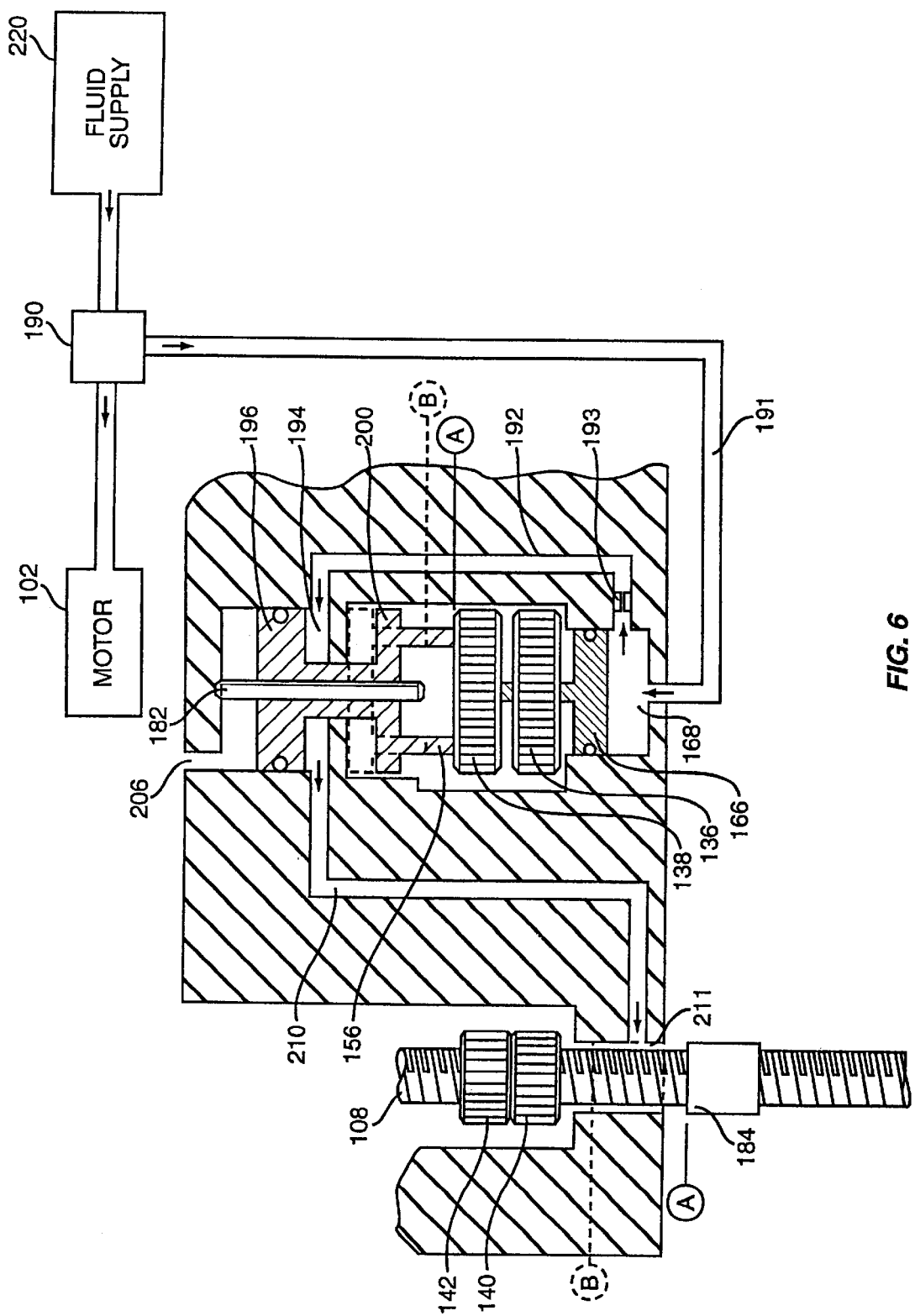
FIG. 6 illustrates a fluid circuit diagram of the positive feed tool illustrated in FIG. 1.

FIG. 6 illustrates a fluid flow schematic depicting how the members 156 may be moved relative to the differential feed gear 138 so as to disengage the members 156 from the differential feed gear 138.

As illustrated in FIG. 6, the energy supply 220, preferably supply of pressurized air, supplies pressurized fluid to a valve 190. For the right angle positive feed tool 100, air is preferably supplied so that when the tool 100 is running the dynamic pressure at the inlet of the tool is roughly 90 psig. The valve 190 is part of an actuation device that causes the differential feed gear 138 to disengage from the differential drive gear 136 to cause the spindle 108 to retract. The valve 190 controls the flow of fluid through the external line 191. When the valve 190 is both actuated and unactuated, pressurized fluid is supplied to the motor 102, which in turn rotates the gears in the drive train 104. Hence, rotation of the motor 102 causes the shaft 144 to rotate the differential drive gear 136 to cause the spindle 108 to feed or retract, as described earlier. However, the valve 190 prevents the flow of pressurized fluid to the underside of the piston 166 when the valve 190 is unactuated. Thus, during normal feeding of the spindle 108, the piston 166 is located in the position illustrated in FIGS. 3 and 4.

When the valve 190 is actuated, it will direct pressurized fluid from the fluid supply 220 to the motor 102 and through the external line 191. The line 191 supplies pressurized fluid to the conduit 174, which supplies pressurized fluid to the cylinder 168 (see FIG. 7A). A conduit 192 communicates the cylinder 168 with the bore 194. The conduit 192 is preferably a machined bore located in the housing 126, but can also be an external air line or the like. The conduit 192 can also be defined by a plurality of interconnecting passageways in the housing 126. Hence, the conduit 192 is located between the cylinder 168 and the bore 194. The conduit 192 opens to the bore 194. Thereafter, a vent conduit 210 is in communication with the interior of the bore 194. The vent conduit 210 opens to atmosphere at a port 211, which is an opening in the housing directly adjacent the spindle 108. The conduits 192, 210 are hidden in the sectional Figures, but are represented schematically by the dashed conduit 192 in the Figures. It would ordinarily be thought that the piston 166 would not actuate when the valve 190 is actuated because the pressurized fluid in the cylinder 168 would escape to atmosphere through the conduit 192, the bore 194, and the vent conduit 210. However, the conduit 193 includes a restriction 193, which restricts the amount of fluid that may transfer through the conduit 192. The restriction 192 is essentially a device which restricts the flow of fluid through the restriction 193, but does not completely prevent fluid flow therethrough.

Thus, when the valve 190 supplies pressurized fluid to the line 191, pressurized fluid is supplied to the cylinder 168. This will cause the first piston 166 to disengage the differential feed gear 138 from the differential drive gear 136. Because the conduit 192 is also in communication with the conduit 192, pressurized fluid will attempt to travel through the conduit 192. However, the restriction 193 limits the amount of pressurized fluid that will travel through the conduit 192 when the valve 190 actuates to such an extent that the pressurized fluid that passes through the restriction 193 will vent to atmosphere through the vent conduit 210, rather than increase the pressure in the bore 194 to any extent that will compress the spring 206. That is, during normal retracting of the spindle, the pressurized fluid supplied to the bore 194 through the restriction 193 is not sufficient to overcome the force of the spring 206—until the retract stop collar 184 blocks the vent channel 210.

In the preferred embodiment, the restriction 193 is a plug that reduces the diameter of the flow area from 1/16" to 1/32". Because the restriction 193 restricts the flow of pressurized fluid to the bore 194, the pressure will build up in the cylinder 168, under the piston 166, when the valve 190 is actuated, but pressure will not build in the bore 194 to an amount that will overcome the spring 206. Rather, the pressure in the bore 194 will only be sufficient to compress the spring 206 when the retract stop collar 184 is retracted to the position B, shown by the dashed lines in FIG. 6, where the retract stop collar 184 will obstruct the vent channel 210. This obstruction of the flow of pressurized fluid to atmospheric pressure will cause the pressure in the conduits 210, 192 to increase, as well as in the bore 194 to such an extent that the piston 196 moves and compresses the spring 206.

As illustrated in FIG. 6, when the retract stop collar 184 is located away from the port 211 to the vent channel 210, the pressurized fluid is free to flow from the conduit 192 through the channel 210 to atmosphere. During operation of the tool 100 when the differential feed gear 138 is disengaged from the differential drive gear 136 and the spindle 108 is retracting, pressurized fluid will flow through the conduit 192 into the bore 194, into the vent channel 210, and out to atmosphere. Because the pressurized fluid is vented to atmosphere in the above manner and the restriction is located in the conduit 192, the pressurized fluid in the bore 194 is not sufficient to overcome the force of the spring 206. Hence, the moveable members 156 will not retract away from the differential feed gear. This permits the differential feed gear 138 to engage with the moveable members 156 so that the spindle 108 will retract.

However, when the spindle 108 retracts to such an extent that the retract stop collar 184 obstructs the vent channel 210, the pressure will build up downstream of the restriction 193 in the conduit 192, and hence in the bore 192. The pressure will build in the bore 194 to such an extent that the force of the spring 206 will be overcome and the piston 196 will move toward the spring 206 and compress it. This will, as described earlier, cause the members 156 to disengage from the differential feed gear 138 and cause the spindle 108 to stop retracting. The piston 196 will move when the vent channel 210 is obstructed to such an extent that the skirt 200 abuts against the stationary ring 204. Hence, the location of the ring 204 in the bore 194 defines the extent of movement of the moveable members 156. In the preferred embodiment, the moveable members 156 retract a distance of approximately 0.070 inches when the skirt 200 abuts against the ring 204.

The retract stop collar 184 does not completely seal the channel 210, but merely obstructs it such that the pressure is increased in the bore 194. However, as will be recognized, the retract stop collar 184 can also completely seal off the vent channel 210 to cause the pressure in the bore 194 to increase. Preferably, the pressure will increase in the bore 194 to greater than approximately 25 psig so as to overcome the force of the spring 206.

In sum, pressurized fluid will enter the bore 194 and move the members 156 when the valve 190 is actuated and when the retract stop collar 184 has obstructed the vent port 211. The pressurized fluid enters the bore 194 on the underside of the piston 196 and is sufficient to overcome the force of the spring 206, which will cause the piston 196 to move against the force of the spring 206 and cause the skirt 200 and moveable members 156 mounted thereto to move in unison. The moveable members 156 and the piston 196 will move relative to the shaft 182 and housing 126. When this occurs, the moveable members 156 will move from position A, illustrated by the solid lines in FIG. 6, to position B, illustrated by the dashed lines in FIG. 6.

When the moveable members 156 are located at position A, the moveable members are coupled to the differential feed gear 136. Because the moveable members 156 are each located in a tight-fitting bore in the housing 126, the moveable members 156, and the skirt 200 to which they are attached, are not rotatable about the longitudinal axis of the pin 182. Hence, when the moveable members 156 are coupled to the differential feed gear 138, they prevent the differential feed gear 138 from rotating relative to the housing 126 as the gear ordinarily does during feeding of the spindle 108. A small vent 206 is located in the housing 126 above the second piston 196 that allows fluid above the piston 196 to escape when the piston 196 is moved relative to the housing 126 and compresses the spring 206. In the preferred embodiment, the vent 206 is defined by clearances between the housing 126 and other components of the tool. It will be appreciated that alternative flow routes will also function as contemplated herein. For example, FIG. 6A illustrates an alternative flow schematic that directs pressurized fluid to the piston 196A.

Figure 6A:
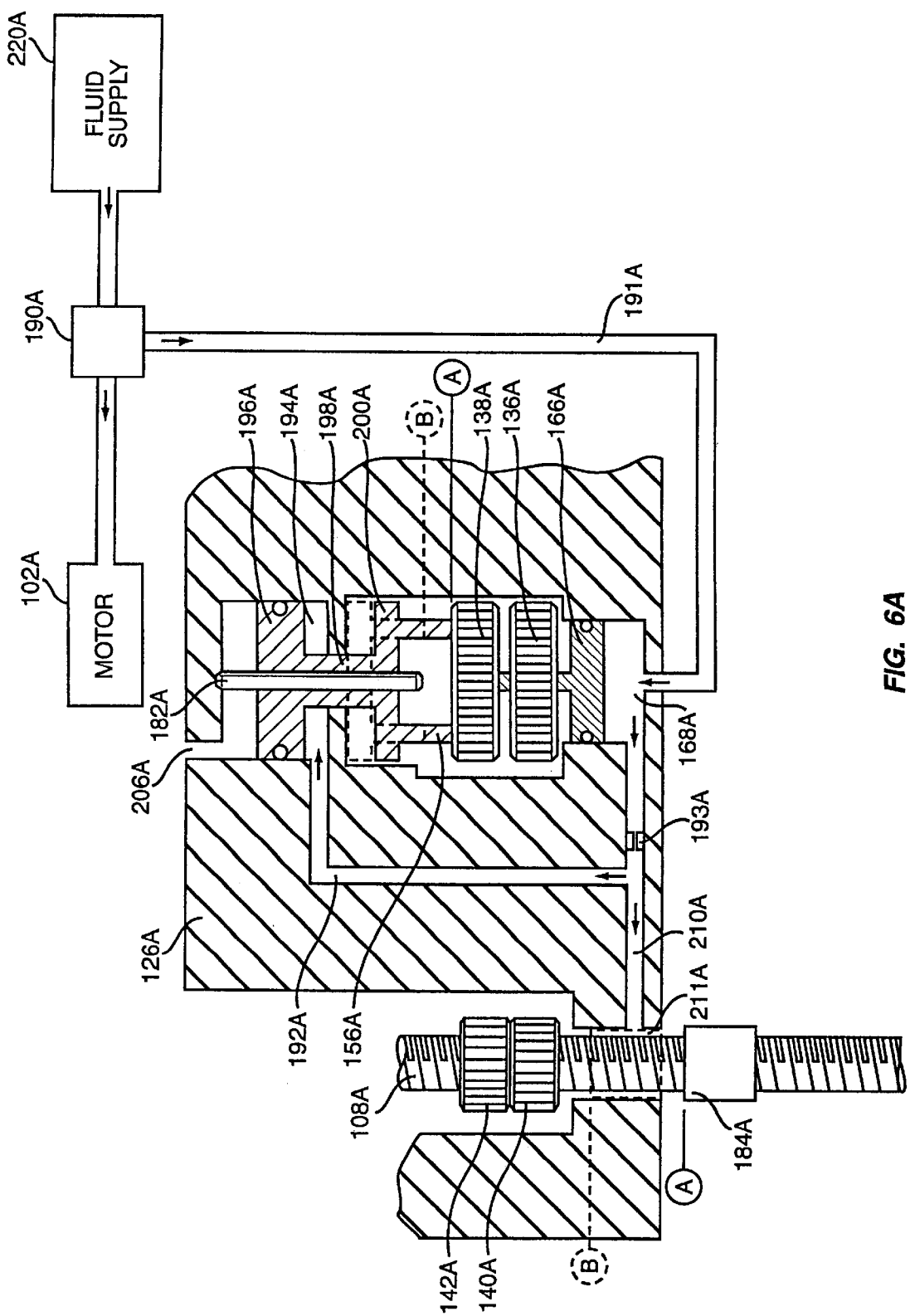
FIG. 6A illustrates an alternative fluid circuit diagram of the positive feed tool illustrated in FIG. 1.

Reference numerals in FIG. 6A refer to like parts in FIGS. 2–6, except that the reference numerals in FIG. 6A include an "A" following the reference numeral. Hence, only a brief description of the alternative flow schematic follows.

As illustrated in FIG. 6A, the vent channel 210A is in communication with the conduit 192A. That is, the conduit 192A between the cylinder 168A and the bore 194A includes a "T" to the vent channel 210A. In this embodiment, the restriction 193A is located in the conduit 192A, but upstream of the break to the vent channel 210. Hence, when pressurized fluid is supplied to the cylinder 168A when the valve 190A is actuated, pressure will build in the cylinder 168A, but not in the bore 194A because the restriction 193A obstructs the flow of air to the bore 194A. However, when the retract stop collar 184A moves to position B, the vent port 211A will be obstructed, which will cause the pressure to build in the channel 210A, the conduit 192A, and thus the bore 194A, which will cause the piston 196A to move and retract the member 156A. As described earlier, this will cause the spindle 108A to stop retracting.

It will also be appreciated that a number of other fluid flow schematics will also suffice to deliver pressurized fluid to the bore 194A to cause the members 156A to retract. For instance, it is not necessary that the valve 190A supply pressurized fluid to move the piston 166A. In this case, the valve 190A may open when the tool 100 enters the retract mode, i.e., when the spindle 108 is first caused to retract, or the valve 190A may be actuated by the retract stop collar 184A at the end of the retract cycle.

FIG. 7A illustrates the moveable members 156 at their first location A, where they engage with the recesses 158 in the differential feed gear 138 so as to cause the spindle 108 to retract. FIG. 7B illustrates the moveable members 156 at their second location B where the moveable members 156 are not engaged with the recesses 158 in the differential feed gear 138. As illustrated in FIG. 7B, it is preferable that the moveable member 156 retract within bores in the housing 126 so that they no longer protrude from the bores 212.

When the moveable members 156 have retracted as illustrated in FIG. 7B, the tool 100 is in a "no feed" mode where the spindle 108 simply is rotating due to the rotation of the differential drive gear 136 and spindle drive gear 140. The tool 100 will remain in this mode until the throttle 116 is shut off. When the throttle 116 is closed, the pressure in the tool 100 will be relieved to atmospheric pressure. This will cause the spring 206 to force the moveable members 156 to position A, and the spring 180 to force the differential feed gear 138 to the position where it is engaged with the differential drive gear 136. Thus, when the throttle 116 is turned on again, a new drilling cycle will begin with the spindle 108 positively advancing toward the workpiece 114.

From the foregoing, it will be appreciated that the tool 100 include a device by which the members 156 may be automatically moved away from the differential feed gear 138, preferably by pneumatic force. That is, the members 156 are moved to cause the spindle 108 to retract independently of the control of an operator.

Although the moveable members 156 have been described in reference to the preferred embodiment of the tool 100 which includes the clutch 106 and the piston 166 for moving the differential feed gear 138, it will be appreciated that the tool 100 need not include these items and still be within the confines of the present invention. Additionally, as described by way of example below, the members 156 can be moved by other devices.

As an alternative to the preferred embodiment, the tool 100 could locate the spring 206 below the piston 196. In this case, air pressure would be maintained in the chamber above the piston 196 during the retract cycle to hold the moveable members down against the force of the spring 206. The retraction of the retract stop collar on the spindle would open a vent to relieve pressure at the completion of the retract cycle and the spring 206 would thus cause the moveable members 156 to move upward so as to disengage from the differential feed gear 138.

Figure 9:
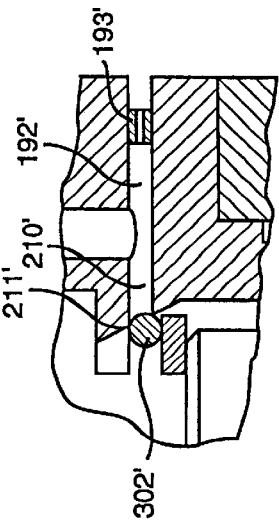
FIG. 9 illustrates an enlarged sectional view of a portion of the right-angle head illustrated in FIG. 8.
Figure 8:
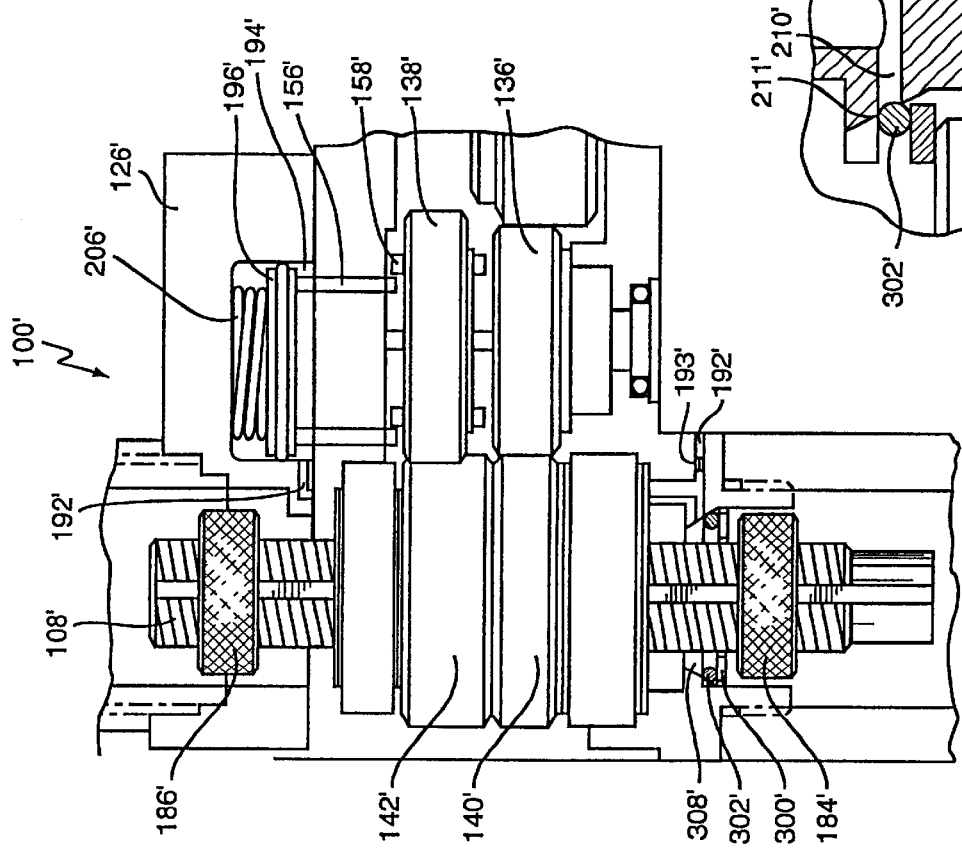
FIG. 8 illustrates a partial sectional view of the right-angle head of a positive feed tool according to another embodiment of the present invention.

FIGS. 8 and 9 illustrate an alternative embodiment of a positive feed tool 100' according to the present invention. The positive feed tool 100' is similar to that illustrated in FIGS. 2–7. Hence, like reference numerals in FIGS. 8 and 9 refer to like parts in FIGS. 2–7, but include a prime (') designation.

The positive feed tool 100' illustrated in FIG. 8 is similar to that illustrated in FIG. 2. Hence, only the right-angle head 122' is illustrated. However, the tool 100' includes an elongated housing 126, an air motor 102, and a throttle 116, like the tool 100.

In the right-angle head 122', the moveable members 156' are defined by a plurality of pins attached to a piston 196'. The piston 196' and the moveable members 156' are biased toward the differential feed gear 138' via the spring 206', similar to that described above in reference to the first embodiment. The piston 196' is located in the bore 194'. The piston 196' is caused to move relative to the housing 126', in a manner similar to that described above in reference to the embodiment illustrated in FIGS. 7A and 7B. That is, the piston 196' is pneumatically actuated from a first position to a second position, where the moveable members 156' retract upward away from the differential feed gear 138' when moved to the second position. However, with the embodiment illustrated in FIG. 8, the retract stop collar 184' does not directly obstruct the vent conduit 210', but rather bears against a washer 300', which pushes against an o-ring 302'. That is, when the spindle 308' retracts such that the retract stop collar 184' bears against the washer 300, the o-ring 302' will move so as to close-off or seal the port 211' to the vent conduit 210'.

FIG. 8 illustrates the stop collar 184' at the moment before it is about to but against the washer 300'. At this moment, the o-ring 302' does not obstruct the port 211'. Rather, the port 211' opens into the area 308', which vents directly to atmosphere around the spindle 108'. At this position, pressurized air supplied into the bore 194' will travel downward through the internal channel 210' and vent to atmosphere through the port 211'.

When the retract stop collar 184' abuts against the washer 300', it will force the washer in the direction of the spindle drive gear 140' such that the washer forces the o-ring 302' to close-off the port 211'. As shown in FIG. 9, when the washer forces the o-ring 302 to seal the port 211', the pressurized fluid traveling through the channel 192' is forced through the restriction 193', which will thus increase the pressure in the chamber 194'. As is apparent from FIG. 8, the pressurized fluid flow is directed to the bore 194' in the same manner that pressurized fluid is directed to the bore 194A in the embodiment shown in FIG. 6A. Increasing the pressure in the bore 194' will cause the piston 196' to move upward against the force of the spring 206', which will cause the moveable members 156' to retract from the differential feed gear 138'. This, in turn, will cause the spindle 108' to enter into the "no feed" mode where the spindle 108' is simply spinning via the differential feed gear 138'. Hence, the spindle 108' stops retracting when the moveable members 156' are moved upward away from the differential feed gear 138'. As also illustrated in FIG. 8, the differential feed gear 138' includes a plurality of protrusions 158' that engage with the moveable members 156' when the piston 196' is unactuated. Hence, the differential feed gear 138' includes protrusions 158', rather than the recesses 158 illustrated in the first embodiment described above.

As is also apparent from FIG. 8, the head 122 does not include a piston for moving the differential feed gear 138'. The differential feed gear 138' may be moved in any variety of manners well known in the art. For example, the differential feed gear 138' may be lifted by the drive collar 142' forcing a lever, similar to that described in the drill 10 illustrated in FIG. 1.

The pressurized fluid is preferably supplied to the conduit 192' via an external line 191' (not illustrated in FIGS. 8 and 9). However, as will be appreciated, pressurized fluid may be supplied to the channel 192' through various channels within the tool, rather than outside the tool. This pressurized fluid may be continuously supplied to the conduit 192' throughout the operational cycles of the tool, i.e., both when the spindle 108 is retracting and advancing.

Furthermore, the retract stop collar 184' illustrated in FIG. 8 is not integral with the spindle 108'. Rather, the retract stop collar 184' is a ring that is threaded on the spindle 108' to a predetermined or desired position. Thus, the point at which the spindle 108' stops retracting can be controlled by adjusting the location of the retract stop collar 184' on the spindle 108'.

Figure 10:
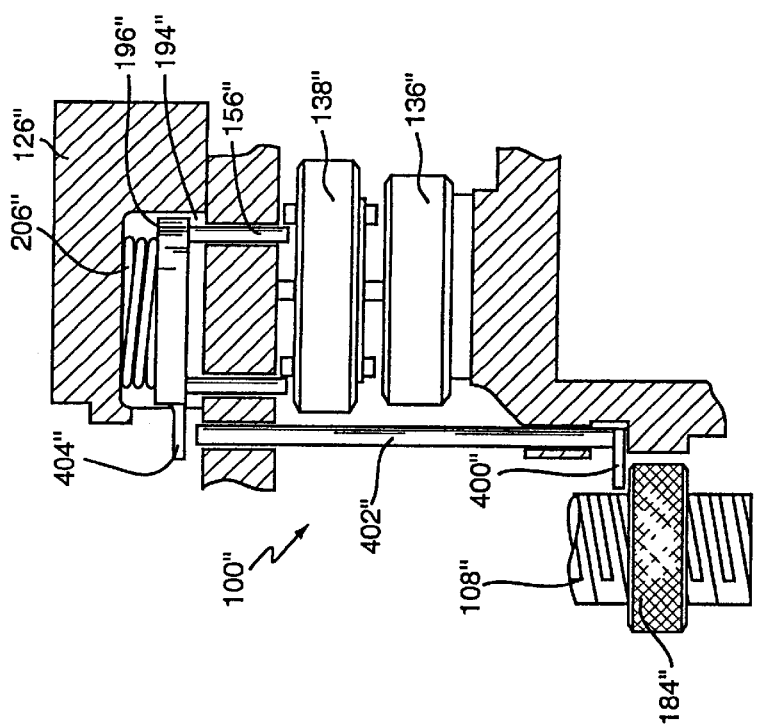
FIG. 10 illustrates a partial sectional view of a right-angle head of a positive feed tool according to a further embodiment of the present invention.

FIG. 10 illustrates a further embodiment of a positive feed tool 100" according to one embodiment of the present invention. The positive feed tool 100" is similar to that illustrated in FIGS. 2–7. Hence, like reference numerals in FIG. 10 refer to like parts in FIGS. 2–7, but include a double-prime (") designation. In the positive feed tool 100", the retract stop collar 184" engages a lever 400" which in turn moves an arm 402" to which the lever 400" is attached. Hence, when the spindle 108" is retracting, the retract stop collar 184" will cause the arm 402" to move when the retract stop collar 184 hits the lever 400".

As illustrated in FIG. 10, the arm 402" engages a member 404" of the piston 196". The member 404" may be integral with or attached to the piston 196". Additionally, the lever 400", arm 402", and member 404" may all be attached. Likewise, the lever 400" may be detached from the arm 402". When the arm 402" moves, it will contact the member 404" and cause the piston 196" to compress the spring 206". This in turn will cause the moveable members 156" to disengage from the differential feed gear 138" so that the spindle 108" no longer feeds, similar to that described earlier in reference to the first and second embodiments illustrated in FIGS. 7 and 8.

From the foregoing, it will be appreciated that the moveable members may be caused to retract away from the differential feed gear by a variety of techniques. For example, in reference to the embodiments illustrated in FIGS. 2 through 7, the moveable members are pneumatically moved away from the differential feed gear. In reference to the embodiment illustrated in FIG. 8, the moveable members are pneumatically moved away from the differential feed gear. However, in reference to the embodiment illustrated in FIG. 10, the moveable members are mechanically moved away from the differential feed gear via a mechanical arm mechanism. It will thus be appreciated that a variety of techniques and apparatus can be used to cause the members to move away from the differential feed gear so as to cause the tool to enter the no feed mode. In this regard, each of the embodiments of the present invention includes a device that automatically moves a member away from a gear of the drive train when the spindle is retracting to cause the spindle to stop retracting. This is advantageous because the retract stop collar, or other similar item, is prevented from torquing on the positive feed tool, which may create a high-torque situation and cause damage to the internal components of the tool. With the apparatus according to the embodiments of the present invention, the spindle is caused to rotate, but not substantially feed or substantially retract when the retract stop collar is about to abut against the tool. This is achieved by retracting the moveable members away from the differential feed gear.

This approach the causing of tool to stop retracting decreases the size of the head of the tool, especially the side-to-centerline distance. This is advantageous because the tool is capable of drilling holes closer to the corner of L-shaped members than conventional right-angle position feed drills, and further because the tool is easier to manipulate than conventional positive feed tools. The techniques and apparatus for stopping the retracting spindle according to embodiments of the present invention are also subject to less wear than those of conventional positive feed drills, and minimize the chance of damaging the components of the tools when the retract stop collar attempts to thread against the housing or other part of the tool.

The principles, preferred embodiments, and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed without departing from the spirit of the present invention. Accordingly, it is expressly intended that all such variations, changes, and equivalents which fall within the spirit and scope of the present invention as defined in the claims be embraced thereby.

What is claimed is:

1. A positive feed tool, comprising:
   a threaded spindle;
   a spindle drive gear coupled to the spindle such that said spindle and said spindle drive gear rotate together;
   a spindle feed gear threaded on the spindle;
   a differential drive gear engaged with the spindle drive gear;
   a differential feed gear engaged with said spindle feed gear, at least one of said differential feed gear and said differential drive gear being moveable from a first position to a second position, said differential feed gear being coupled to said differential drive gear when said at least one of said differential feed gear and said differential drive gear is located at said first position such that said differential feed gear and said differential drive gear rotate together, said differential feed gear not being coupled to said differential drive gear when said at least one of said differential feed gear and said differential drive gear is located at said second position; and
   a moveable member that is moveable between a first location and a second location, said moveable member for preventing rotation of said differential feed gear when said moveable member is at said first location and said one of said differential feed gear and said differential drive gear is located at said second position, said moveable member not preventing rotation of said differential feed gear when said moveable member is at said second location and said one of said differential feed gear and said differential drive gear is located at said second position.

2. The positive feed tool of claim 1, wherein said differential feed gear is said one of said differential feed gear and said differential drive gear that is moveable from said first position to said second position.

3. The positive feed tool of claim 2, wherein said moveable member includes at least one pin, said at least one pin for preventing rotation of said differential feed gear when said moveable member is at said first location and said differential feed gear is at said second position.

4. The positive feed tool of claim 2, wherein said moveable member includes at least one pin, and said differential feed gear includes at least one of a recess and a protrusion, said pin and said one of said recess and said protrusion interfering to prevent rotation of said differential feed gear when said moveable member is at said first location and said differential feed gear is at said second position.

5. The positive feed tool of claim 1, further comprising a spring, said spring for biasing said moveable member toward said differential feed gear.

6. The positive feed tool of claim 1, further comprising:
   means for moving said moveable member from said first location to said second location when said spindle is retracted to a predetermined position.

7. The positive feed tool of claim 6, wherein said moving means includes an air valve that is actuatable to pneumatically move said moveable member from said first location to said second location.

8. The positive feed tool of claim 6, wherein said moving means includes a lever that moves said moveable member from said first location to said second location.

9. The positive feed tool of claim 1, wherein said tool includes at least one of a pneumatic motor and an electric motor for causing the spindle to rotate.

10. The positive feed tool of claim 1, further comprising a right-angle head.

11. The positive feed drill of claim 1, further comprising a housing, said moveable member being located in said housing such that said moveable member is not rotatable relative to said housing and is moveable along an axis substantially parallel to a rotation axis of said differential feed gear.

12. A positive feed tool, comprising:
    a threaded spindle;
    a spindle drive gear coupled to said spindle such that said spindle and said spindle drive gear rotate together;
    a spindle feed gear threaded on said spindle;
    a differential feed gear engaged with said spindle feed gear for causing said spindle to advance or retract;
    a differential drive gear engaged with said spindle drive gear for causing said spindle to rotate;
    means for preventing said differential feed gear from rotating to cause said spindle to retract while said spindle is rotating; and
    means for moving at least a portion of said preventing means away from said differential feed gear to cause said spindle to stop retracting while said spindle is rotating.

13. The positive feed tool of claim 12, further comprising a spring, said preventing means including a moveable member having a pin, said spring biasing said pin toward said differential feed gear, said pin for preventing said differential feed gear from rotating.

14. A method in a positive feed tool having a differential feed gear engaged with a spindle feed gear for causing a spindle to retract, the method comprising:
    preventing rotation of the differential feed gear with a member to cause the spindle to retract; and
    moving the member away from the differential feed gear to cause the spindle to stop retracting.

15. The method of claim 14, wherein the moving of the member away from the differential feed gear disengages pins from the differential feed gear to cause the spindle to stop retracting while the spindle is rotating.

16. The method of claim 14, wherein the member is moved away from the differential feed gear by pneumatically moving the member.

17. The method of claim 16, wherein the member is pneumatically moved by actuating an air valve when the spindle retracts to a predetermined location.

18. The method of claim 17, wherein the air valve is actuated by at least partially obstructing a vent port with the spindle or a device that moves with the spindle.

19. The method of claim 14, wherein the member is automatically moved away from the differential feed gear by tripping a lever with the spindle or a device that moves with the spindle.

20. The method of claim 14, wherein the positive feed tool includes a pneumatic motor and a right-angle head.

21. A positive feed tool, comprising:
   a threaded spindle;
   a motor;
   a drive train rotatably connecting said threaded spindle and said motor, said drive train for causing said threaded spindle to advance and retract while said spindle is rotating; and
   means for moving a member away from a gear of the drive train when said spindle is retracting to cause said spindle to stop retracting.

22. A positive feed tool, comprising:
   a threaded spindle;
   a spindle drive gear rotationally coupled to said spindle to rotate together therewith;
   a spindle feed gear threaded on said spindle;
   a differential drive gear engaging said spindle drive gear, rotation of said differential drive gear causing said spindle to rotate;
   a differential feed gear engaging said spindle feed gear, said differential feed gear having at least first, second, and third operational modes, wherein rotation of said differential drive gear causes said differential feed gear to rotate with the same rotational speed in said first mode, wherein said differential feed gear is restrained against rotation in said second mode, and wherein said differential feed gear is driven by said spindle feed gear in said third mode without restraint.

23. The positive feed tool of claim 22 wherein said differential feed gear rotates about an axis and wherein said differential feed gear moves along said axis between a first position associated with said first mode and a second position associated with said second and third modes and wherein said differential feed gear is biased towards said first position.

24. The positive feed tool of claim 22 wherein said differential feed gear is pneumatically switched between said first, second, and third modes.

25. The positive feed tool of claim 22 wherein said differential feed gear rotates about an axis and wherein said differential feed gear moves along said axis between a first position associated with said first mode and a second position associated with said second and third modes, said positive feed tool further comprising:
   a moveable member, said moveable member including at least one pin and moveable parallel to said axis between an engaged position wherein said pin restrains the rotational movement of said differential feed gear when said differential feed gear is in said second position and a disengaged position wherein said pin allows rotational movement of said differential feed gear when said differential feed gear is in said second position, wherein said moveable member is relatively rotationally fixed in said engaged position and said disengaged position.

26. The positive feed tool of claim 25 wherein said moveable member is pneumatically switched between said engaged and disengaged positions.

27. The positive feed tool of claim 25 wherein said moveable member is biased towards said engaged position.

* * * * *